Patented Nov. 1, 1932

1,885,556

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

PROCESS FOR THE VULCANIZATION OF RUBBER AND PRODUCTS OBTAINED THEREBY

No Drawing.     Application filed July 25, 1928.     Serial No. 295,348.

The present invention relates to the vulcanization of rubber by an improved process wherein the products obtained by reacting aldehyde-amine products with substituted unsaturated aldehydes, preferably in the presence of an acid, are employed as vulcanization accelerators. More particularly the present invention relates to the vulcanization of rubber in the presence of a vulcanization accelerator comprising a reaction product of a compound formed by reacting the reaction product of substantially equi-molecular proportions of an aliphatic aldehyde and an organic amine with an unsaturated aldehyde, substituted in the alpha and beta position in the presence of an acid, preferably an organic acid, which functions primarily as a condensing medium or catalyst.

The preferred means of manufacturing the new class of compounds and their use as accelerators in the rubber vulcanization process will be understood from the following description and examples.

One of the preferred type of compounds, for example the reaction product of butylidene aniline and alpha-ethyl-beta-propyl-acrolein was prepared in the following manner:

Approximately one molecular proportion of alpha-ethyl-beta-propyl-acrolein (126 parts) and approximately one molecular proportion of butylidene aniline (147 parts) were placed in a reactor and a quantity of butyric acid added equal to substantially 3% by weight of the alpha-ethyl-beta-propyl-acrolein employed. The reaction mixture was digested in a steam bath for approximately forty hours. The resulting product was an oily liquid that had a distinct odor of alpha-ethyl-beta-propyl-acrolein, showing that under these conditions the reaction did not reach completion.

A duplicate run was made of the one just described excepting that no acid was used as a condensing agent. This product, after the heat treatment, was much lighter in color than that obtained by the condensation in the presence of butyric acid, and appeared to contain more unreacted alpha-ethyl-beta-propyl-acrolein than did the product manufactured in the presence of an acid.

Another of my preferred type of compounds was prepared by reacting substantially equi-molecular proportions of heptaldehyde aniline and alpha-ethyl-beta-propyl-acrolein. The acrolein derivative contained approximately 3% of butyric acid. After the addition of the acidified alpha-ethyl-beta-propyl-acrolein, the mixture was digested in a hot water bath heated with live steam for substantially 72 hours. The final product was an orange colored oil which had no odor of alpha-ethyl-beta-propyl-acrolein thus indicating the reaction went to completion, due to the longer heating period. As another example of the preferred type of compounds, the reaction product of butylidene iso-amylamine and alpha-ethyl-beta-propyl-acrolein was prepared in the following manner: Approximately one molecular proportion of iso-amylamine (87 parts) was reacted with approximately one molecular proportion of butylaldehyde (72 parts). During the reaction, the mixture was cooled by immersion in an ice bath. After the reaction was completed the product was allowed to stand for about one-half hour after which substantially one molecular proportion (126 parts) of alpha-ethyl-beta-propyl-acrolein, containing about 6% heptylic acid was added. The mixture was then placed in a closed container and digested for about 72 hours in a boiling water bath. The resulting product is a reddish orange oil and has no odor of alpha-ethyl-beta-propyl-acrolein.

The reaction product of butylidene p-amino-dimethylaniline and alpha-ethyl-beta-propyl-acrolein was also prepared. Approximately equi-molecular proportions of butylidene p-amino-dimethylaniline and alpha-ethyl-beta-propyl-acrolein, said acrolein derivative containing about 8% by weight of valeric acid were digested for about 72 hours in a container immersed in a boiling water bath. In all the other examples given in this specification a well defined and distinct layer of water separated from the final reaction product which was eliminated therefrom as by decantation and the like. In this instance there was no difference in color between the water layer and the black, oily reaction product, so that separation by decantation and the like could not be effected. In order to remove the water, the entire reaction product was treated with anhydrous sodium sulfate and after thus standing for several hours the black, oily reaction product possessing no odor of alpha-ethyl-beta-propyl-acrolein was separated.

On digesting substantially equi-molecular proportions of butylidene p-phenetidine and alpha-ethyl-beta-propyl-acrolein, said acrolein derivative containing about 3% by weight of butyric acid, on a hot water bath heated with live steam for about 72 hours, a dark reddish oil was obtained as the reaction product thereof.

The reaction products of aldehyde amines and substituted unsaturated aldehydes other than alpha-ethyl-beta-propyl-acrolein have been prepared. Thus, for example, approximately equi-molecular proportions of butylidene aniline and alpha-methyl-beta-ethyl-acrolein, said acrolein derivative containing about 3% by weight of butyric acid, were placed in a closed container and digested for about 72 hours in a water bath heated with live steam. The product formed is a reddish orange colored liquid.

Other aldehyde amines react similarly with other substituted unsaturated aldehydes to form the preferred class of vulcanization accelerators.

The utility of the class of compounds hereinbefore described is illustrated by the following examples of the invention as claimed herein. In these examples compounds of the preferred type are employed as accelerators in the vulcanization of typical rubber stocks. Thus various rubber mixes were prepared in the ordinary manner comprising 100 parts of pale crepe rubber,
5 parts of zinc oxide,
3.5 parts of sulfur, and
0.375 parts of accelerator.

As accelerators there were employed the various products indicated in the table given below. The various stocks so obtained were then vulcanized by heating the samples in a press and then testing the samples which had been vulcanized under the conditions indicated. The accelerators used are designated in the following table as A, B, C, D, E, F and G, wherein—

A is the reaction product of substantially equi-molecular proportions of butylidene aniline and alpha-ethyl-beta-propyl-acrolein in the presence of a small amount of butyric acid.

B is the reaction product of substantially equi-molecular proportions of butylidene aniline and alpha-ethyl-beta-propyl-acrolein, said reaction taking place in the absence of an acid.

C is the reaction product of substantially equi-molecular proportions of heptaldehyde aniline and alpha-ethyl-beta-propyl-acrolein in the presence of butyric acid.

D is the reaction product of substantially equi-molecular proportions of butylidene isoamylamine and alpha-ethyl-beta-propyl-acrolein in the presence of heptylic acid.

E is the reaction product of substantially equi-molecular proportions of butylidene p-amino dimethyl-aniline and alpha-ethyl-beta-propyl-acrolein in the presence of valeric acid.

F is the reaction product of substantially equi-molecular proportions of butylidene p-phenetidine and alpha-ethyl-beta-propyl-acrolein in the presence of butyric acid.

G is the reaction product of substantially equi-molecular proportions of butylidene aniline and alpha-methyl-beta-ethyl-acrolein in the presence of butyric acid.

The physical characteristics of the vulcanized stocks were found to be as follows:

| Accelerator | Time of cure | Modulus of elasticity in lbs. per square inch at elongations of— | | | Tensile at break in lbs/in² | Per cent ultimate elongation |
|---|---|---|---|---|---|---|
| | | 300% | 500% | 700% | | |
| A | 10 minutes at 40 lbs. steam | 107 | 213 | 637 | 1,745 | 880 |
| A | 20 minutes at 40 lbs. steam | 164 | 345 | 1,170 | 2,370 | 830 |
| A | 30 minutes at 40 lbs. steam | 217 | 505 | 1,785 | 2,860 | 800 |
| A | 45 minutes at 40 lbs. steam | 273 | 677 | 2,615 | 3,275 | 790 |
| B | 10 minutes at 40 lbs. steam | 59 | 101 | 217 | 942 | 990 |
| B | 20 minutes at 40 lbs. steam | 111 | 180 | 474 | 1,485 | 940 |
| B | 30 minutes at 40 lbs. steam | 128 | 255 | 775 | 2,010 | 890 |
| B | 45 minutes at 40 lbs. steam | 167 | 354 | 1,155 | 2,430 | 850 |
| C | 10 minutes at 40 lbs. steam | 141 | 282 | 903 | 2,255 | 875 |
| C | 20 minutes at 40 lbs. steam | 247 | 614 | 2,260 | 3,000 | 750 |
| C | 30 minutes at 40 lbs. steam | 292 | 869 | 3,185 | 3,410 | 725 |
| C | 45 minutes at 40 lbs. steam | 317 | 920 | 3,375 | 3,375 | 700 |
| D | 10 minutes at 40 lbs. steam | 162 | 399 | 1,400 | 2,715 | 815 |
| D | 20 minutes at 40 lbs. steam | 285 | 759 | 2,835 | 3,220 | 733 |
| D | 30 minutes at 40 lbs. steam | 224 | 1,050 | 3,820 | 3,820 | 700 |
| D | 45 minutes at 40 lbs. steam | 291 | 1,190 | | 3,550 | 663 |
| E | 10 minutes at 40 lbs. steam | 112 | 210 | 597 | 1,965 | 925 |
| E | 20 minutes at 40 lbs. steam | 200 | 457 | 1,585 | 2,635 | 790 |
| E | 30 minutes at 40 lbs. steam | 238 | 647 | 2,510 | 3,350 | 760 |
| E | 45 minutes at 40 lbs. steam | 315 | 810 | 3,000 | 3,545 | 735 |

| Accelerator | Time of cure | Modulus of elasticity in lbs. per square inch at elongations of— | | | Tensile at break in lbs/in² | Per cent ultimate elongation |
|---|---|---|---|---|---|---|
| | | 300% | 500% | 700% | | |
| F | 10 minutes at 40 lbs. steam | 138 | 316 | 1,030 | 2,230 | 845 |
| F | 20 minutes at 40 lbs. steam | 243 | 627 | 2,340 | 3,120 | 745 |
| F | 30 minutes at 40 lbs. steam | 300 | 923 | 3,365 | 3,600 | 710 |
| F | 45 minutes at 40 lbs. steam | 369 | 1,055 | 3,620 | 3,620 | 700 |
| G | 10 minutes at 40 lbs. steam | 94 | 187 | 553 | 1,455 | 888 |
| G | 20 minutes at 40 lbs. steam | 167 | 387 | 1,245 | 2,475 | 828 |
| G | 30 minutes at 40 lbs. steam | 221 | 600 | 2,175 | 2,750 | 753 |
| G | 45 minutes at 40 lbs. steam | 256 | 742 | 2,680 | 3,330 | 745 |

The above results show that the type of accelerators herein claimed, that is, the reaction product of aldehyde amines and substituted unsaturated aldehydes, produce vulcanized rubber of a high quality.

The foregoing examples are to be understood as illustrative only and not at all limitative of the invention. Other vulcanized products may be obtained by employing other compounding ingredients and other proportions of ingredients than those particularly set forth in the example.

What is claimed is:

1. The process of vulcanizing rubber which comprises heating rubber and sulfur in the presence of a vulcanization accelerator comprising the reaction product of an alkylidene aryl amine and alpha-ethyl-beta-propyl-acrolein.

2. The process of vulcanizing rubber which comprises heating rubber and sulfur in the presence of a vulcanization accelerator comprising the reaction product, in the presence of an organic acid containing from four to seven carbon atoms, of an alkylidene aryl amine and alpha-ethyl-beta-propyl-acrolein.

3. The process of vulcanizing rubber which comprises heating rubber and sulfur in the presence of a vulcanization accelerator comprising the reaction product, in the presence of butyric acid, of butylidene aniline and alpha-ethyl-beta-propyl-acrolein.

4. The vulcanized rubber product obtained by heating rubber and sulfur in the presence of a vulcanization accelerator comprising the reaction product of an alkylidene aryl amine and alpha-ethyl-beta-propyl-acrolein.

5. The vulcanized rubber product obtained by heating rubber and sulfur in the presence of a vulcanization accelerator comprising the reaction product, in the presence of an organic acid containing from four to seven carbon atoms, of an alkylidene aryl amine and alpha-ethyl-beta-propyl-acrolein.

6. The vulcanized rubber product obtained by heating rubber and sulfur in the presence of a vulcanization accelerator comprising the reaction product, in the presence of butyric acid, of butylidene aniline and alpha-ethyl-beta-propyl-acrolein.

7. The process of vulcanizing rubber which comprises heating rubber and sulfur in the presence of a vulcanization accelerator consisting of the reaction product of a saturated aldehyde and an amine further reacted with one member of a group comprising alpha-ethyl-beta-propyl-acrolein and alpha-methyl-beta-ethyl-acrolein.

8. The vulcanized rubber produced by heating rubber and sulfur in the presence of a vulcanization accelerator consisting of the reaction product of a saturated aldehyde and an amine, further reacted with one member of a group comprising alpha-ethyl-beta-propyl-acrolein and alpha-methyl-beta-ethyl-acrolein.

In testimony whereof I hereunto affix my signature.

WINFIELD SCOTT.